United States Patent Office 3,545,924
Patented Dec. 8, 1970

3,545,924
METHOD OF PREPARING CHLORYL FLUORIDE
John P. Faust, Hamden, Albert W. Jache, North Haven, and Andrew J. Klanica, Cheshire, Conn., assignors to Olin Mathieson Chemical Corporation
No Drawing. Filed Oct. 21, 1965, Ser. No. 500,342
Int. Cl. C01b 7/24, 11/00
U.S. Cl. 23—203         3 Claims

ABSTRACT OF THE DISCLOSURE

Chloryl fluoride is prepared by heating a mixture of gaseous oxygen and chlorine monofluoride in a closed container at a temperature of 80 to 200° C. and at autogenous pressure for at least one hour.

---

This invention relates to a novel process for the preparation of chloryl fluoride having the formula $FClO_2$. More particularly this invention relates to the direct reaction of oxygen with chlorine monofluoride to form chloryl fluoride.

Chloryl fluoride is known and useful as a fluorinating agent and as a vigorous oxidizer. It would be valuable as a rocket fuel oxidizer and for other purposes if it could be made cheaply available. The prior art methods for the manufacture of chloryl fluoride usually require the use of elemental fluorine which is produced electrolytically at high cost.

It is an object of this invention to prepare chloryl fluoride by a process avoiding costly elemental fluorine. Another object of this invention is to prepare chloryl fluoride from chlorine monofluoride which can be made more cheaply than elemental fluorine. A further object of this invention is to prepare chloryl fluoride using the cheaper chlorine monofluoride as reagent. Other and further objects appear in the following description.

It has now been found that chlorine monofluoride reacts directly with oxygen gas at autogenous pressures and at temperatures from 80° to 200° C. to form chloryl fluoride. The chloryl fluoride boils at −6° C. at atmospheric pressure and is easily separated from the reaction mixture by fractional distillation or condensation. The principal other components of the reaction mixture are unreacted oxygen and chlorine monofluoride boiling at −183° C. and −100° C., respectively.

The process of the present invention comprises heating a mixture of oxygen and chlorine monofluoride at from 80° to 200° C. for at least one hour to produce chloryl fluoride. Suitably the reaction mixture is fractionally distilled to separate the chloryl fluoride from the reaction mixture.

Advantageously oxygen is used in excess of the stoichiometric, equimolar amount since it is the cheaper reactant. The molar ratio of oxygen to chlorine monofluoride is appropriately from 1:1 to 10:1 or more. Ratios of about 4:1 to 6:1 are preferred in order to obtain adequate conversion without undue dilution. After heating the mixture of gases under autogenous pressure at from 80° to 200° C. for one hour or more, the chloryl fluoride formed is separated from the gas mixture by any suitable means, for example, fractional condensation or fractional distillation. For many purposes the crude reaction mixture is useful without the necessity of separation, for example, the liquefied reaction mixture is useful as an oxidizer for rocket fuels.

EXAMPLE I 0.2 g. (3.67 millimoles) of ClF was transferred into a clean, dry 95 ml. Monel cylinder which was fitted with a Monel valve. A −196° C. bath was then placed around the cylinder and 0.6 g. (18.8 millimoles) of oxygen was condensed in.

The cylinder was closed and heated to 90° C. for one hour and the gaseous contents were then examined by infrared analysis. The analysis indicated that approximately ⅓ of the ClF was converted to $FClO_2$ and ⅔ of the ClF was unreacted.

The cylinder was then placed in an 80° C. bath and allowed to stand for 16 hours. At the end of this time the contents of the cylinder were again examined by infrared analysis. This time the analysis indicated that approximately ½ of the ClF had been converted to $FClO_2$.

EXAMPLE II

The procedure of Example I was repeated using 0.4 g. (7.34 millimoles) of ClF and 1.1 g. (34.5 millimoles) of $O_2$ at a temperature of 95° C. for 64 hours. Conversion of ⅓ of the ClF to $FClO_2$ was shown by infrared analysis.

EXAMPLE III

The procedure of Example I was repeated at a temperature of 200° C. for four days with essentially the same results.

What is claimed is:
1. Process for preparing chloryl fluoride which comprises heating a mixture of gaseous oxygen and chlorine monofluoride at from 80° to 200° C. in a closed container and at autogenous pressure for a time of at least one hour to produce chloryl fluoride.
2. Process as claimed in claim 1 in which the molar ratio of oxygen to chlorine monofluoride in said mixture is from 1:1 to 10:1.
3. Process as claimed in claim 2 in which the temperature is from 80° to 90° C. and the time is from 1 to 16 hours.

References Cited

UNITED STATES PATENTS 3,320,031   5/1967   Grosse et al. _____ 23—203

OTHER REFERENCES

Stacey et al.—Advances In Fluorine Chemistry, vol. 4, 1965, p. 242, published by Butterworth & Co., London.
Ryss—The Chemistry of Fluorine And Its Inorganic Compounds, pp. 133, 134 & 140, AEC tr. 3927 (pt. 1) Translation, Moscow, 1956.

OSCAR R. VERTIZ, Primary Examiner

E. C. THOMAS, Assistant Examiner